United States Patent [19]

Dobias

[11] Patent Number: 4,494,692
[45] Date of Patent: Jan. 22, 1985

[54] STEAM TRAP

[76] Inventor: John J. Dobias, 1212 Sumach Dr., Windsor, Canada, N8S 2S4

[21] Appl. No.: 303,396

[22] Filed: Sep. 18, 1981

[51] Int. Cl.[3] .............................................. F16T 1/04
[52] U.S. Cl. ...................................... 236/59; 55/462; 55/218; 137/183; 403/194; 236/101 E
[58] Field of Search .............. 236/59, 101 E; 137/183, 137/185, 188; 55/217, 218, 462, 465; 251/360; 403/194

[56] References Cited

U.S. PATENT DOCUMENTS

| | | | |
|---|---|---|---|
| 80,436 | 7/1868 | Wilson | 236/59 |
| 897,285 | 9/1908 | Greenaway | 236/59 |
| 1,738,809 | 12/1929 | Walter | 137/183 X |
| 1,930,224 | 10/1933 | Crosthwait, Jr. | 236/59 X |
| 2,101,338 | 12/1937 | Lovekin | 236/101 E X |
| 2,629,553 | 2/1953 | Velan | 236/59 |
| 2,857,186 | 10/1958 | Bonetti | 403/194 |
| 2,866,519 | 12/1958 | Hazlett et al. | 55/218 |
| 3,433,412 | 3/1969 | Breton | 236/59 |

FOREIGN PATENT DOCUMENTS 1147240  4/1963  Fed. Rep. of Germany ........ 236/59
506318  5/1939  United Kingdom .................. 236/59

Primary Examiner—William E. Tapolcai
Attorney, Agent, or Firm—Barnes, Kisselle, Raisch, Choate, Whittemore & Hulbert

[57] ABSTRACT

Steam trap structure including a bi-metal strip for actuating valve means to control passage of steam through the steam trap in accordance with the temperature within the steam trap. The bi-metal strip may be straight or may have an arcuate portion on one end thereof and is constructed of alternate layers of steel and brass adjacent pairs of which may be connected together. In a modification all of the steel and brass layers may be connected together. An additional biasing steel layer may be included in the bi-metal strip. The steam trap of the invention further includes multiple coarse and fine strainers adjacent to the outlet valve and unique outlet valve structure including a flanged valve seat and cooperable conical valve member adapted to be self mounting in an opening in the steam trap.

6 Claims, 8 Drawing Figures

STEAM TRAP

BACKGROUND OF THE INVENTION

1. Field of the Invention

The invention relates to steam traps and refers more specifically to a steam trap including unique self mounting valve means for regulating the passage of steam therethrough actuated by a bi-metallic strip having alternate layers of steel and brass secured together.

2. Description of the Prior Art

In the past steam traps have included manually activated valves opened on rotation of a valve stem electric solinaid actuated valve means have also been provided in steam traps in the past.

Wherein temperature regulated valve means have been provided in prior steam traps they have been relatively complicated and therefore expensive to manufacture and not always efficient in use.

SUMMARY OF INVENTION

In accordance with the invention a steam trap is provided including temperature responsive valve means for controlling passage of steam therethrough which temperature responsive valve means is actuated by a bi-metal strip in accordance with the temperature in the steam trap.

The bi-metal strip in the steam trap of the invention is constructed of alternate layers of steel and brass. In one modification of the invention the alternate steel and brass layers are secured together in pairs while in another embodiment of the invention all of the alternate steel and brass layers are secured together.

An additional steel layer may be provided on one side of the bi-metal member if desired to provide a bias against movement of the bi-metal member in the direction of the additional steel member.

Alternatively, the bi-metal member may be straight or may have an arcuate portion on one end thereof.

The intake to the steam trap includes a baffl thereacross having weep holes in the bottom thereof. Thus, steam entering the steam trap and condensate are separated at the intake.

The bi-metal members of the steam trap of the invention may be mounted on a support having a drainage opening in the bottom thereof.

A plurality of strainer members are provided over the steam trap outlet valve and the valve is constructed with an annular flange on one end thereof cooperable with a cylindrical member so as to be self mounting in an opening in the steam trap.

DESCRIPTION OF THE PREFERRED EMBODIMENT

Figure 1:
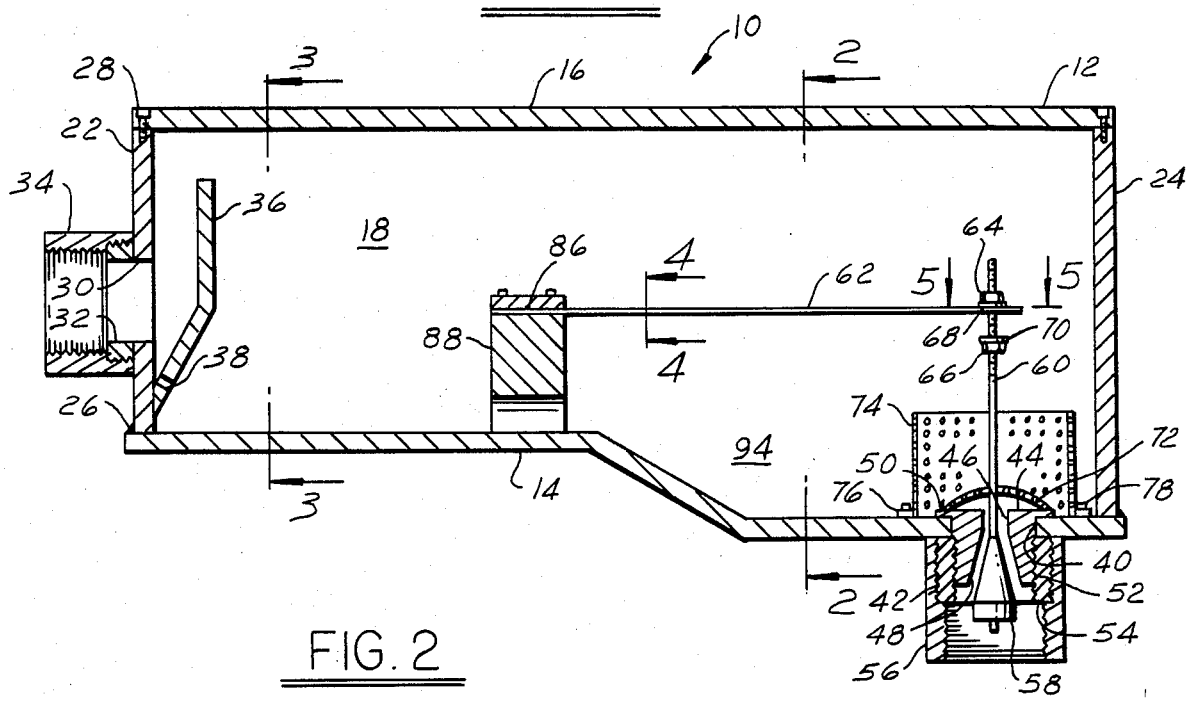
FIG. 1 is a longitudinal section view of a steam trap constructed in accordance with the invention.
Figure 2:
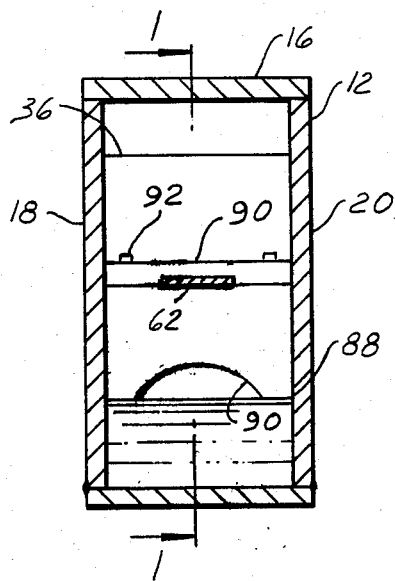
FIG. 2 is a section view of the steam trap illustrated in FIG. 1 taken substantially on the line 2—2 in FIG. 1.

The steam trap 10 shown best in FIG. 1, includes a general rectangular hollow body member 12 including bottom 14, top 16, sides 18 and 20 and ends 22 and 24. The sides 18 and 20 and ends 22 and 24 are secured together and to the bottom 14 by convenient means such as welds 26. Top 12 is secured to the ends 22 and 24 and sides 18 and 20 by convenient means such as bolts 28 so as to be removable from the rest of steam trap 10.

End 22 has opening 30 therein to which the externally threaded cylinder 32 is welded. Ultimately the cylinder 32 will receive a coupling 34 for securing a steam line to the steam trap 10.

Figure 3:
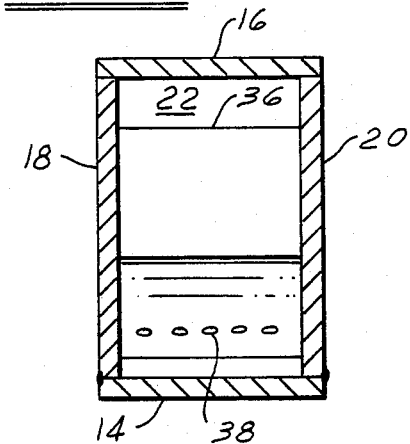
FIG. 3 is a section view of the steam trap illustrated in FIG. 1, taken substantially on the line 3—3 in FIG. 1.

A baffel 36 is secured to the end plate 22 by convenient means such as welds within the hollow body member 12 as shown best in FIGS. 1 and 3 Baffel 36 has weep holes 38 adjacent the bottom thereof. The function of baffel 36 is to separate steam entering intake opening 30 in the steam trap 10 from condensate which flows to the bottom of the steam trap through the weep holes 38.

An opening 40 is provided in the bottom 14 of the steam trap 10 for receiving a valve structure 42. Valve structure 42 includes the valve seat member 44 which is general cylinder and includes an opening 46 extended axially therethrough which includes a conical valve seat portion 48. The valve seat members 44 further includes the radially outwardly extending flange 50 on the inner end thereof. The outer periphery of the outer end 52 of the valve seat member 44 is threaded to receive a cylindrical member 54 which is threaded both internally and externally to engage both the valve seat member 44 and the steam pipe coupling 56 as shown best in FIG. 1.

Thus, the valve structure 42, including the valve seat member 44 and cylindrical member 54, is self installing in the opening 40 in the bottom 14 of the steam trap hollow body member 12.

The valve structure 42 further includes the conical valve member 58 complimentary to the conical valve seat 48 of the valve seat member 44. The valve stem 60 shown best in FIG. 1, is integral with the valve member 58. The valve member 58 is mounted on a bi-metal member 62 in the steam trap 10 by means of the two bolts 64 and 66 positioned on the threaded valve stem 60 in engagement with the washers 68 and 70 which serve to limit movement of nuts 64 and 66 toward each other.

Figure 5:
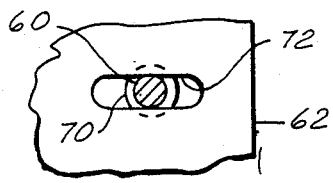
FIG. 5 is an enlarged partial section view of the steam trap of FIG. 1, taken substantially on the line 5—5 in FIG. 1.

As shown best in FIG. 5, the bi-metal member 62 is provided with a longitudinally extending slot therein through which the valve stem 60 extends. The valve stem 60 is thus permitted substantially free movement on the bi-metal member 62 longitudinally thereof to align the valve member 58 with the valve seat 48. The valve member 58 is moved axially with respect to and up and down with the bi-metal member 62 to open and close the valve structure 42 and thus regulate the flow of steam through the steam trap.

A dish shaped disc, top strainer 72 through which the stem 60 extends is provided over the opening 46 in the valve seat member 44 as shown.

A second, cylindrical strainer 74 is positioned over the dish shaped strainer 72 and extends axially of the valve stem 60. Structure 74 is secured in position on the bottom 14 of the hollow body member 12 of the steam trap 10 by convenient means such as flange 76 and bolts 78.

Figure 4:
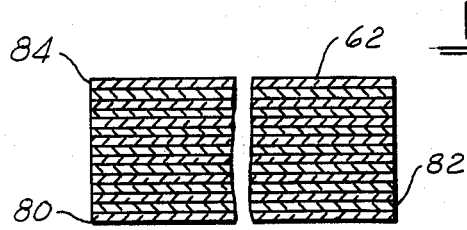
FIG. 4 is an enlarged broken section view of the bi-metal member of the steam trap of FIG. 1, taken substantially one the line 4—4 in FIG. 1.

The bi-metal member 62 which is enlarged and shown in broken section in FIG. 4, includes a plurality of separate steel and brass member layers, 80 and 82 respectively. As shown in FIG. 4, there are seven brass layers and eight steel layers in the bi-metal member 62.

The bottom seven pairs of steel and brass layers are secured together. Between each steel and brass bi-metal member strip consisting of one steel and one brass member the members are separated that is the pairs of steel and brass members are not connected to other pairs.

Thus, the arcuate movement of the bi-metal member 62 will be the arcuate movement of each separate steel and brass bi-metal pair. The total force with which the bi-metal member 62 may close the valve means 42 is with such structure the combined force of the bi-metal pairs.

A separate steel layer 84 is positioned on top of bi-metal member 62, shown in FIG. 4 and provides an initial bias somewhat restricting the ability of the steel and brass member pairs to move the free end of the bi-metal member 62.

The bi-metal member 62 is mounted at the fixed end in 86 on support 88. Support 88 is positioned centrally of the hollow body member 12 of the steam trap 10 and includes an arch 90 in the bottom thereof through which condensate may pass along the bottom 14 of the steam trap 10. The fixed end 86 of the bi-metal member 62 is secured to the support 88 by the clamp member 90 by convenient means shown as the bolt 92.

In overall operation of the steam trap 10 steam enters the opening 30 and passes over the baffel 36 into the hollow body member 12 of the steam trap 10. Condensate is separated from the steam at the baffel 36 and is drained through the weep holes 38 to the bottom 14 of the steam trap 10 and proceeds through the arch 90 in support 88 into the sump area 94 in the bottom of the hollow body member 12.

The condensate is then strained through corse cylindrical strainer 74 and then through the fine dish-shaped strainer 72 and then passes through a valve means 42 with the valve member 58 in a lower or open position as shown in FIG. 1.

When the temperature in the steam trap 10 reaches a pre-determined level as a result of the steam in the steam trap 10 the bi-metal member 62 will be caused to assume an arcuate configuration so that the free end of the bi-metal member 62 will move upward in FIG. 1 to close the valve means 42.

Subsequentially, as the temperature is lowered in the steam trap 10 the bi-metal member 62 will return to the state shown in FIG. 1, wherein the valve means 42 is reopened.

The above operation of the steam trap will proceed automatically on temperature changes occuring in the hollow body member 12. The valve means 42 will thus be opened or closed at pre-determined temperatures without expenditure of electrical energy or manual operation. Further, it will be seen that the steam trap 10 is both simple and easy to manufacture and therefore will be inexpensive.

While one embodiment of the steam trap of the invention has been considered in detail it will be understood that other embodiments and modifications of the invention are contemplated.

Figure 6:
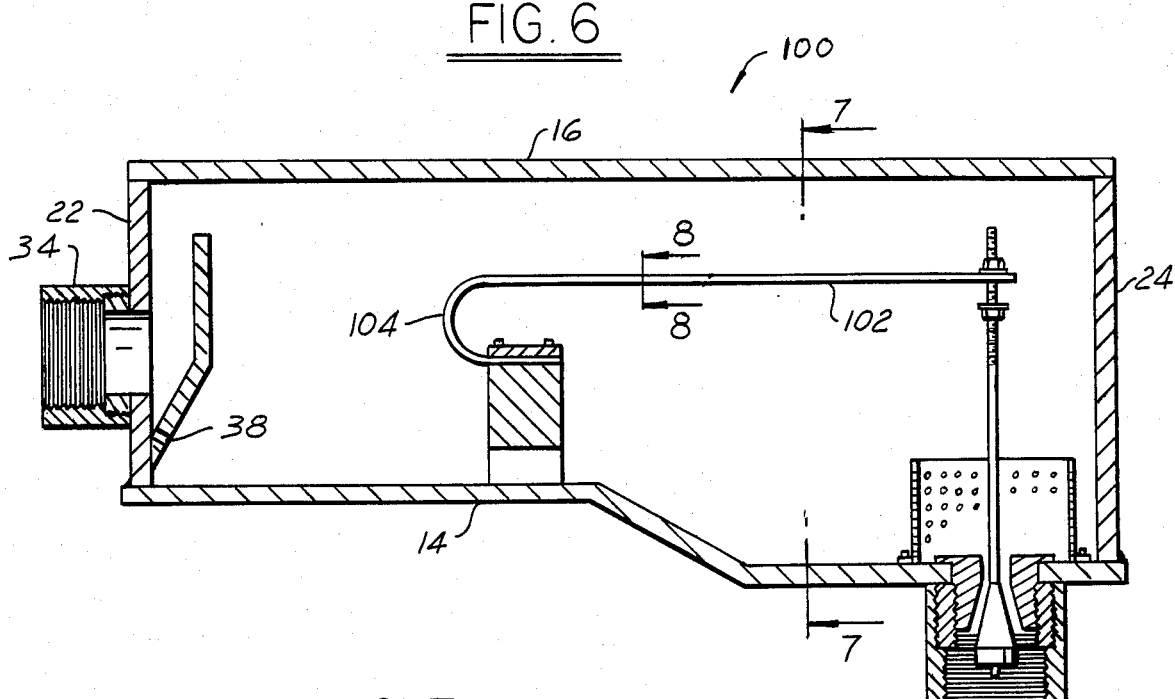
FIG. 6 is a longitudinal section view of a second embodiment of the steam trap of the invention.
Figure 7:
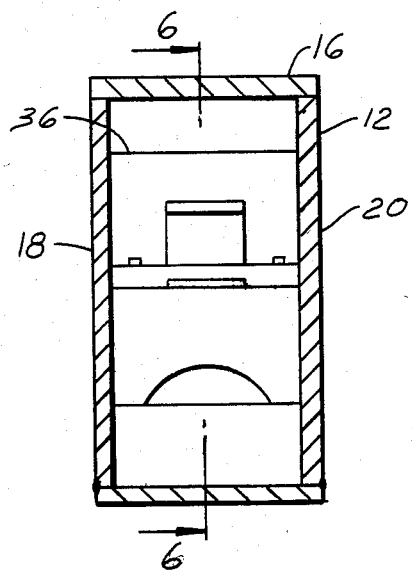
FIG. 7 is a section view of the embodiment of the steam trap illustrated in FIG. 6, taken substantially on the line 7—7 in FIG. 6.
Figure 8:
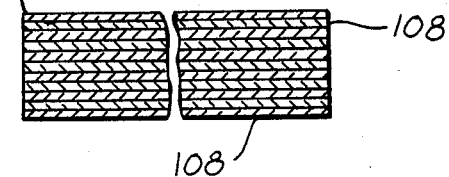
FIG. 8 is an enlarged broken section view of the bi-metal member of the steam trap structure shown in FIG. 6, taken substantially on the line 8—8 in FIG. 6.

Thus, the modified steam trap 100 shown in FIGS. 6–8 includes a bi-metal member 102 having been an arcuate potion 104 making a complete 180° bend. The bi-metal member 102 has a tendancy to provide greater movement of the free end thereof than member 62 for a given temperature change and structure due to the arcuate portion 104 thereof.

In fact, member 102 as shown best in FIG. 8 is constructed of 5 brass members 108 with 6 steel members 106 making 11 layers in all.

In the embodiment of the invention shown in FIG. 6, all of the 11 steel and brass members are secured together. The bi-metal member 102 is therefore stiffer than the bi-metal member 62.

Also, the strainer is eliminated from the steam trap 100.

In all other respects the steam trap 100 is the same as the steam trap 10 and its operation is substantially the same.

It is the intention to include all embodiments and modifications, as are defined by the appended claims within the scope of the invention.

I claim:

1. A steam trap comprising a generally rectangular hollow body including two parallel spaced apart sides, two parallel spaced apart ends, a bottom having a lower portion at one end thereof forming a sump for collection of fluids in the one end of the steam trap together with one end of the hollow body and the ends of the side walls at the one end of the hollow body, and a removable cover, an opening in the other end of the hollow body through which steam and fluids enter the steam trap, an exteriorly threaded coupling member secured to the hollow body around the opening in the other end of the hollow body for connecting a steam pipe thereto, a baffel extending completely across the other end of the hollow body within the hollow body and extending upwardly from the bottom of the hollow body over the opening in the other end of the hollow body and including openings therethrough adjacent the bottom thereof whereby steam moisture entering into the hollow body through the opening in the other end thereof are separated at the baffel, an opening in the bottom of the hollow body within the sump adjacent the one end of the hollow body through which fluid is passed out of the steam trap, a cylindrical valve seat member including an external thread on one end thereof and an annular outwardly extending flange on the other end thereof having a conical valve seat extending axially therethrough, an internally and externally threaded cylindrical member threadedly engaged with the threaded one end of the valve seat member and clamping the periphery of the opening in the bottom of the hollow body between the flange on the valve seat member and one end of the cylindrical member to secure the valve seat member in the opening in the bottom, a conical valve complimentary to the conical valve seat and including a stem thereon extending upwardly through the valve seat into the hollow body positioned within the valve seat, a pair of spaced apart nut and washer combinations threaded onto the valve member stem, bi-metal means including a plurality of alternate layers of brass and steel members with each brass member being connected to one adjacent steel member positioned within the hollow body, a separate extra steel member positioned on the bi-metal means whereby both top and bottom of the bi-metal means is a steel member for providing initial bias for the bi-metal means, a slot in one end of the bi-metal means receiving the stem of the valve member therethrough between the nut and washer combinations thereon, the other end of the bi-metal means being arcuate and extending in a full 180° arc to provide a portion extending substantially parallel to the remainder of the bi-metal means, support structure for the bi-metal means extending completely across the hollow body at the bottom thereof and having an arcuate recess completely through the bottom thereof to permit flow of liquid along the bottom of the hollow body to the sump from the baffel and means for securing the parallel portion of the bi-metal means to the top of the support structure, a cylindrical strainer positioned over the opening through the bottom of the hollow body and extending axially along the stem of the valve member and a dish-shaped strainer concave inwardly of the hollow body positioned over the valve seat member with the stem of the valve member extending therethrough.

2. A steam trap comprising a generally rectangular hollow body including two parallel spaced apart sides, two parallel spaced apart ends, a bottom having a lower portion at one end thereof forming a sump for collection of fluids in the one end of the steam trap together with one end of the hollow body and the ends of the side walls at the one end of the hollow body, and a removable cover, an opening in the other end of the hollow body through which steam and fluids enter the steam trap, an exteriorly threaded coupling member secured to the hollow body around the opening in the other end of the hollow body for connecting a steam pipe thereto, a baffel extending completely across the other end of the hollow body within the hollow body and extending upwardly from the bottom of the hollow body over the opening in the other end of the hollow body and including openings therethrough adjacent the bottom thereof whereby steam and moisture entering into the hollow body through the opening in the other end thereof are separated at the baffel, an opening in the bottom of the hollow body within the sump adjacent the one end of the hollow body through which fluid is passed out of the steam trap, a cylindrical valve seat member including an external thread on one end thereof and an annular outwardly extending flange on the other end thereof having a conical valve seat extending axially therethrough, an internally and externally threaded cylindrical member threadedly engaged with the threaded one end of the valve seat member and clamping the periphery of the opening in the bottom of the hollow body between the flange on the valve seat member and one end of the cylindrical member to secure the valve seat member in the opening in the bottom, a conical valve complimentary to the conical valve seat and including a stem thereon extending upwardly through the valve seat into the hollow body positioned within the valve seat, a pair of spaced apart nut and washer combinations threaded onto the valve member stem, bi-metal means including a plurality of alternate layers of brass and steel members with each brass member being connected to one adjacent steel member positioned within the hollow body, a separate extra steel member positioned on the bi-metal means whereby both top and bottom of the bi-metal means is a steel member for providing initial bias for the bi-metal means, a slot in one end of the bi-metal means receiving the stem of the valve member therethrough between the nut and washer combinations thereon, support structure for the bi-metal means extending completely across the hollow body at the bottom thereof and having an arcuate recess completely through the bottom thereof to permit flow of liquid along the bottom of the hollow body to the sump from the baffel and means for securing the parallel portion of the bi-metal means to the top of the support structure, and a strainer positioned over the opening through the bottom of the hollow body.

3. Structure as set forth in claim 2, wherein the other end of the bi-metal means is substantially straight.

4. Structure as set forth in claim 2, wherein the other end of the bi-metal means is arcuate and extends in a full 180° arc to provide a portion extending substantially parallel to the remainder of the bi-metal means.

5. Structure as set forth in claim 2, wherein the strainer is an open ended cylinder and extends axially along the stem of the valve member.

6. Structure as set forth in claim 2, wherein the strainer is dish-shaped and concave inwardly of the hollow body and is located over the valve seat member with the stem of the valve member extending therethrough.

* * * * *